(No Model.) 7 Sheets—Sheet 1.
A. D. NEAL & H. F. EATON.
ELECTRIC TYPE WRITER.
No. 487,228. Patented Nov. 29, 1892.
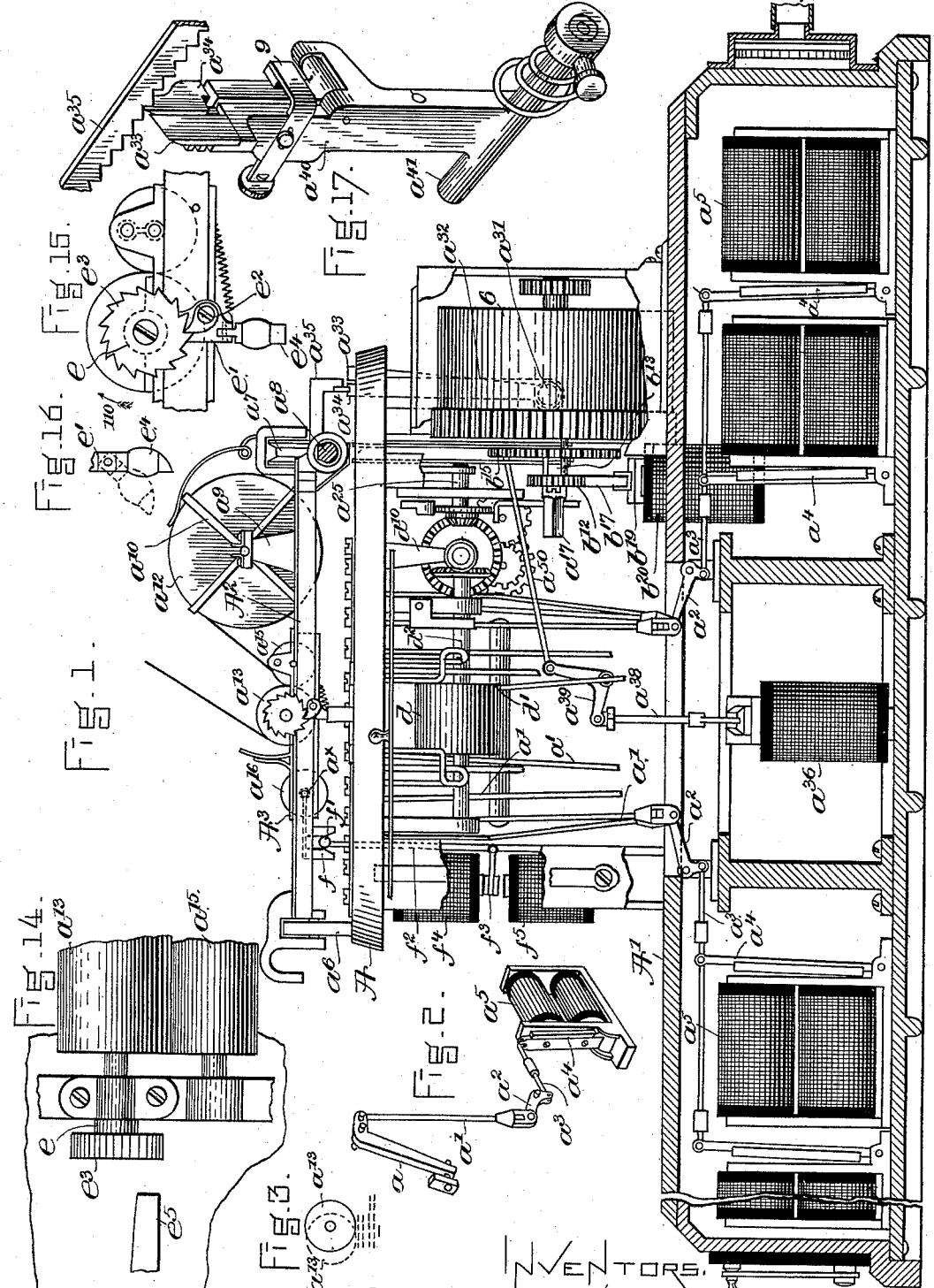
WITNESSES.
R. Henry Marsh
Louis N. Gowell
INVENTORS.
Albert D. Neal
Howard F. Eaton
by Crosby & Gregory Attys
THE NORRIS PETERS CO., PHOTO-LITHO., WASHINGTON, D. C.

(No Model.) 7 Sheets—Sheet 3.
A. D. NEAL & H. F. EATON.
ELECTRIC TYPE WRITER.
No. 487,228. Patented Nov. 29, 1892.
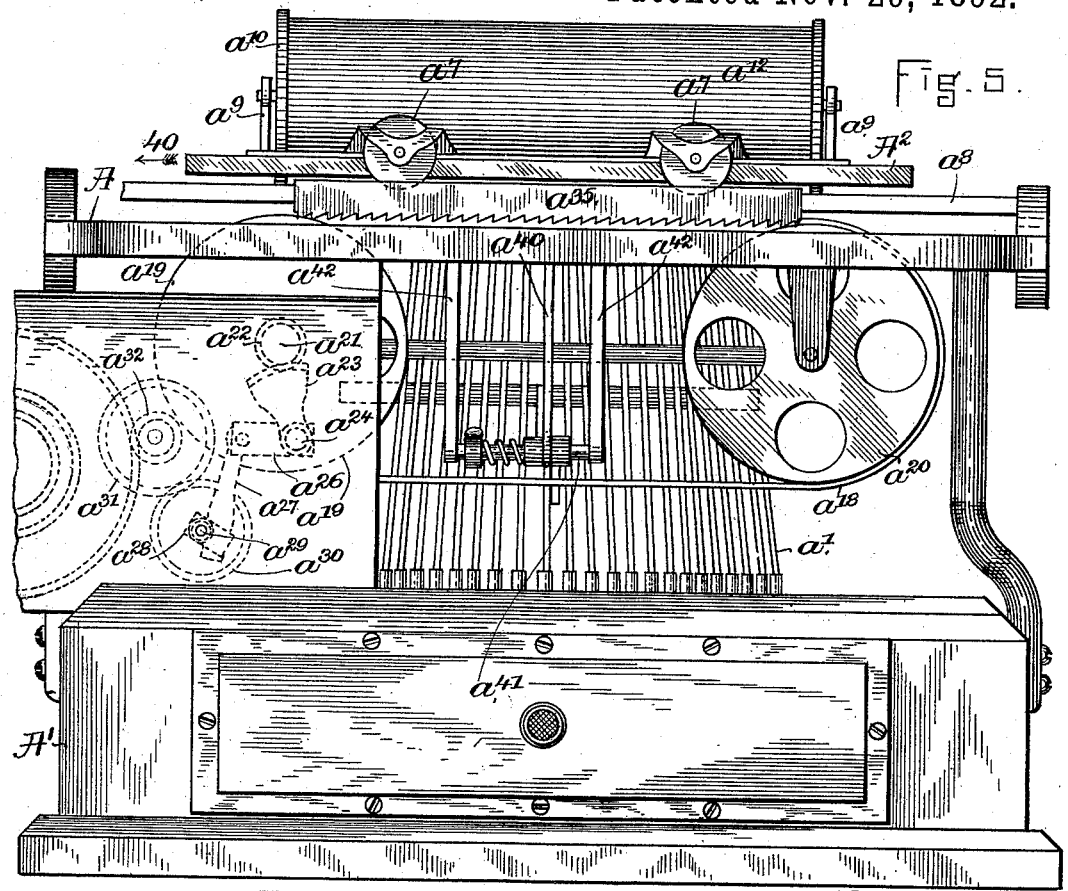
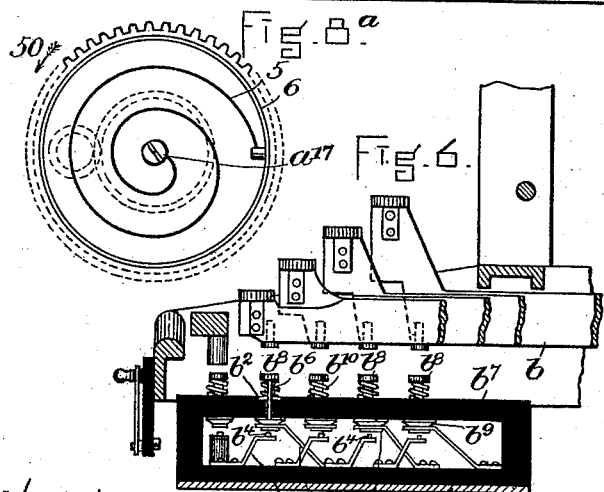
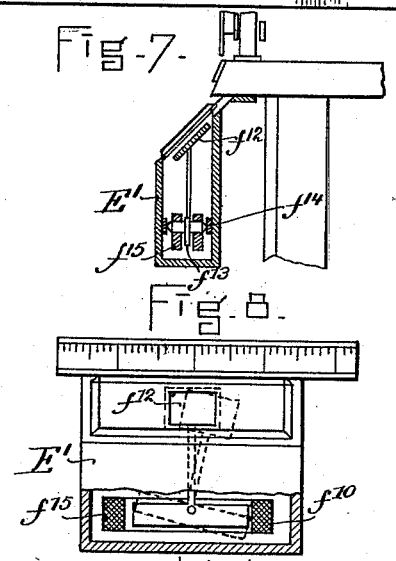
Witnesses.
Henry Marsh
Louis N. Gowell
Inventors.
Albert D. Neal
Howard F. Eaton,
By Crosby & Gregory attys.

(No Model.) 7 Sheets—Sheet 4.
A. D. NEAL & H. F. EATON.
ELECTRIC TYPE WRITER.
No. 487,228. Patented Nov. 29, 1892.
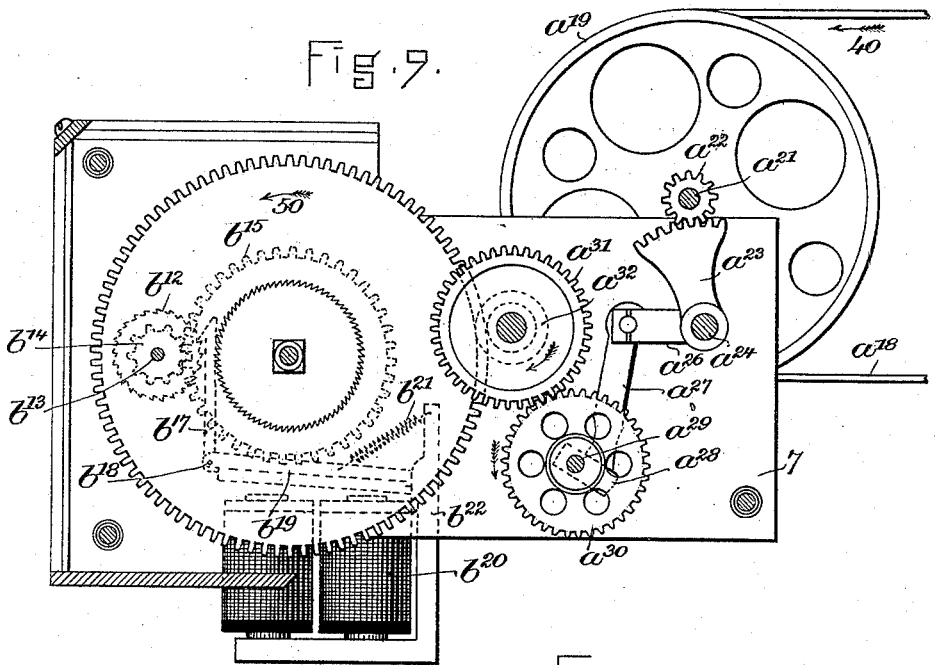
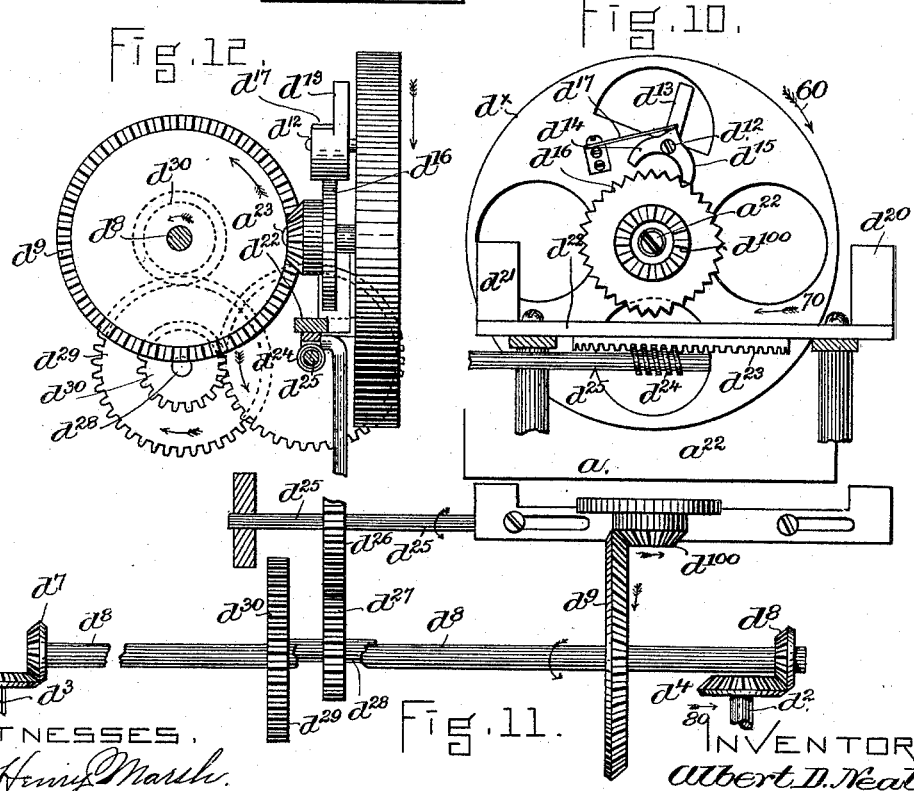
WITNESSES.
INVENTORS.

(No Model.)  7 Sheets—Sheet 5.

A. D. NEAL & H. F. EATON.
ELECTRIC TYPE WRITER.

No. 487,228.  Patented Nov. 29, 1892.

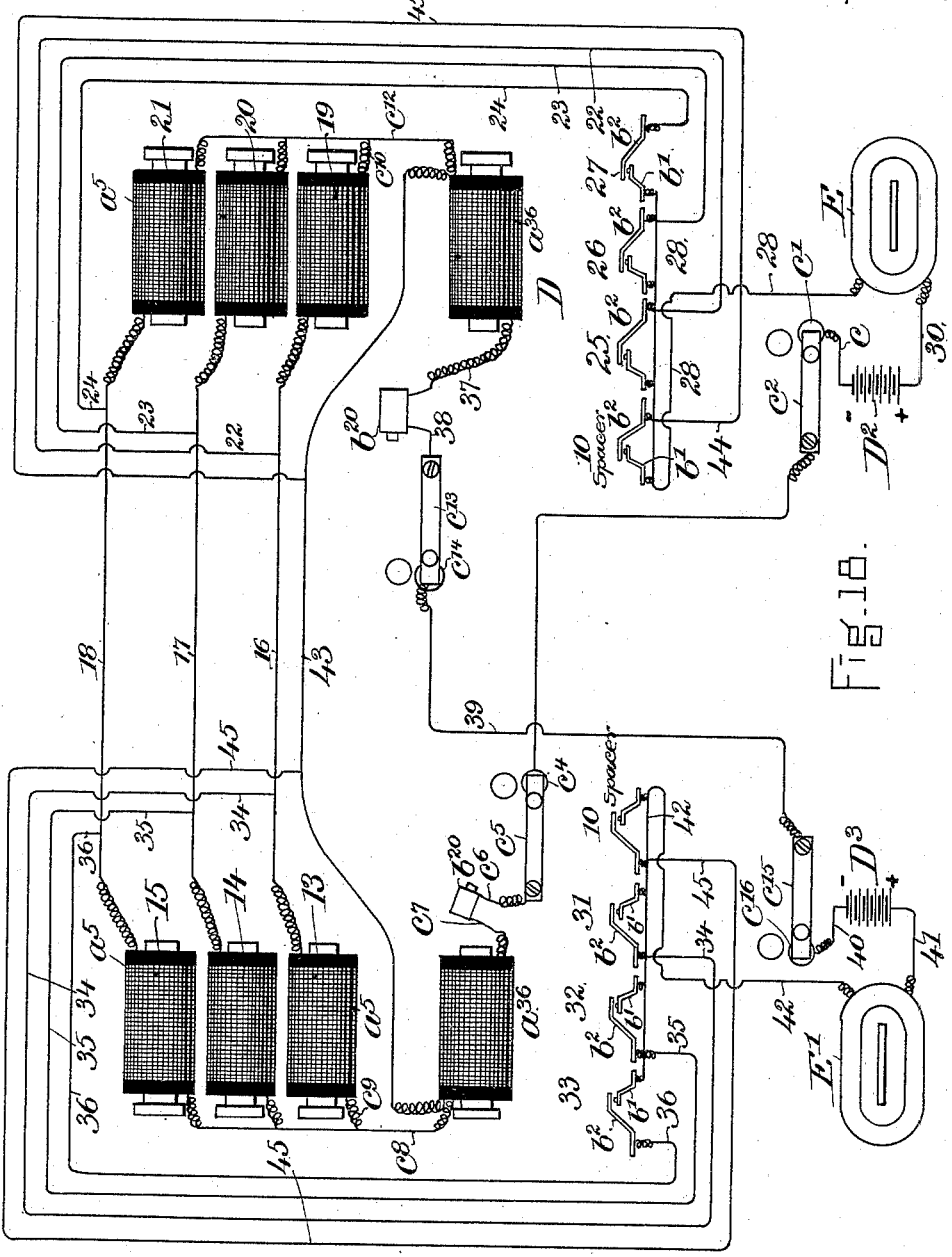

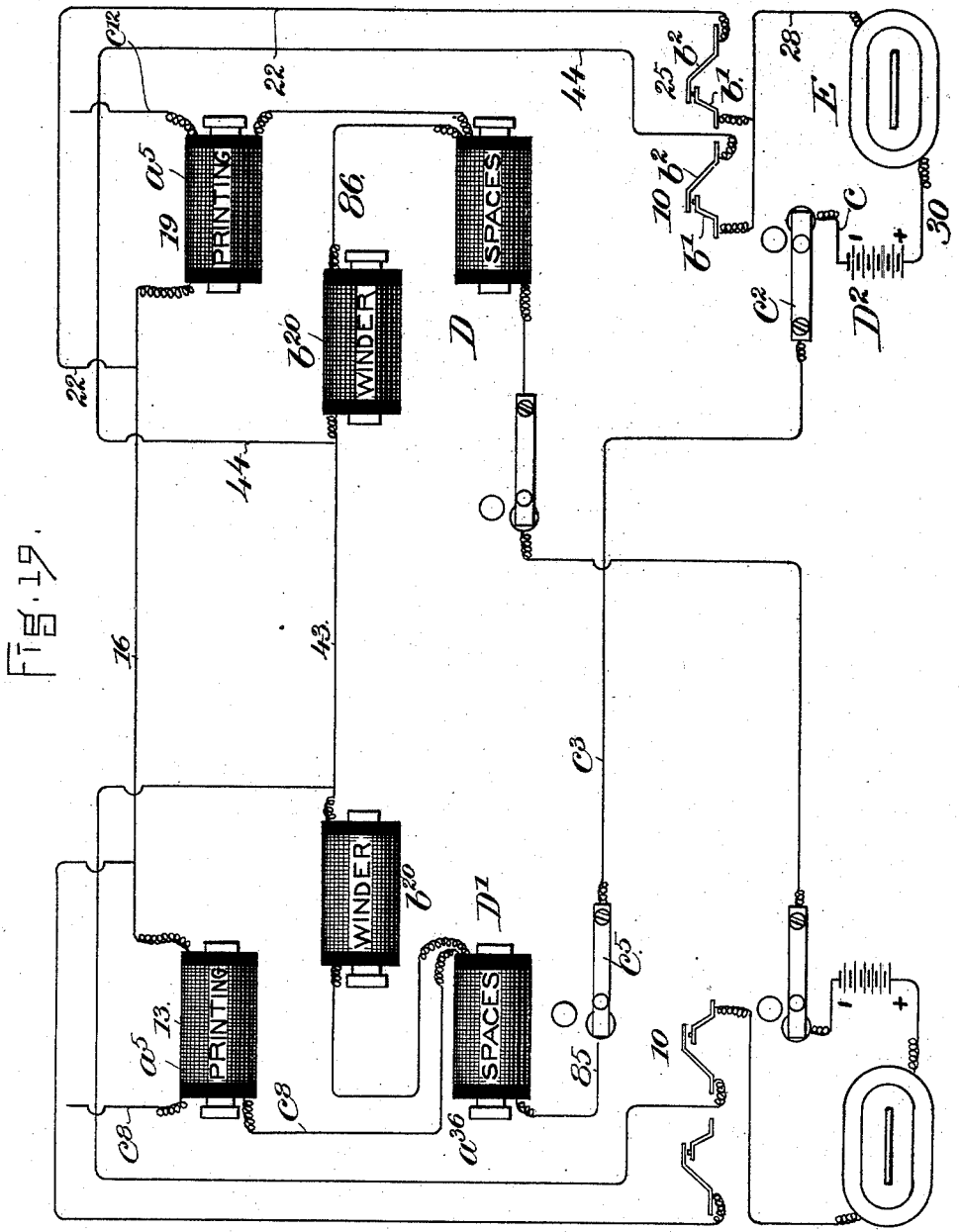

UNITED STATES PATENT OFFICE.

ALBERT D. NEAL, OF BOSTON, AND HOWARD F. EATON, OF QUINCY, MASSACHUSETTS; SAID EATON ASSIGNOR TO SAID NEAL.

ELECTRIC TYPE-WRITER.

SPECIFICATION forming part of Letters Patent No. 487,228, dated November 29, 1892.

Application filed May 27, 1892. Serial No. 434,604. (No model.)

*To all whom it may concern:*

Be it known that we, ALBERT D. NEAL, of Boston, county of Suffolk, and HOWARD F. EATON, of Quincy, county of Norfolk, State of Massachusetts, have invented an Improvement in Electric Type-Writers, of which the following description, in connection with the accompanying drawings, is a specification, like letters and figures on the drawings representing like parts.

This invention relates to a novel system for intercommunication in which a type-writer at a transmitting-station is electrically connected to a type-writer at a distant or receiving station.

Our present invention is an improvement upon the invention shown and described in another application, Serial No. 434,603, filed May 27, 1892, and has for one of its objects to improve the construction of the motor mechanism employed to reciprocate the carriage carrying the impression-roller and paper.

Another feature of our present invention consists in an automatic feed mechanism for the ink-ribbon, whereby the said ribbon may be wound and unwound, as will be described.

Other features of our invention will be pointed out in the claims at the end of this specification.

Figure 4:
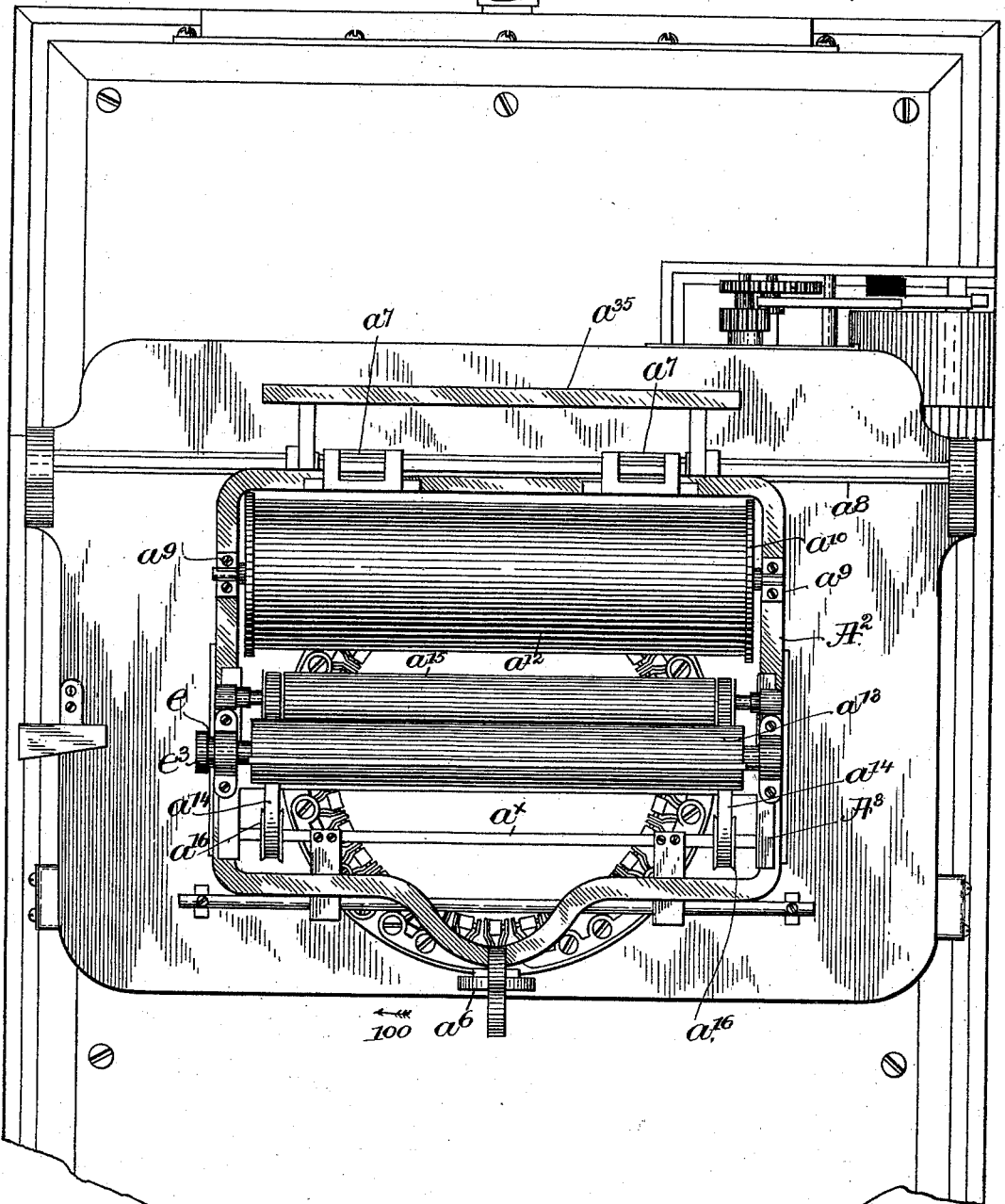
Figure 13:
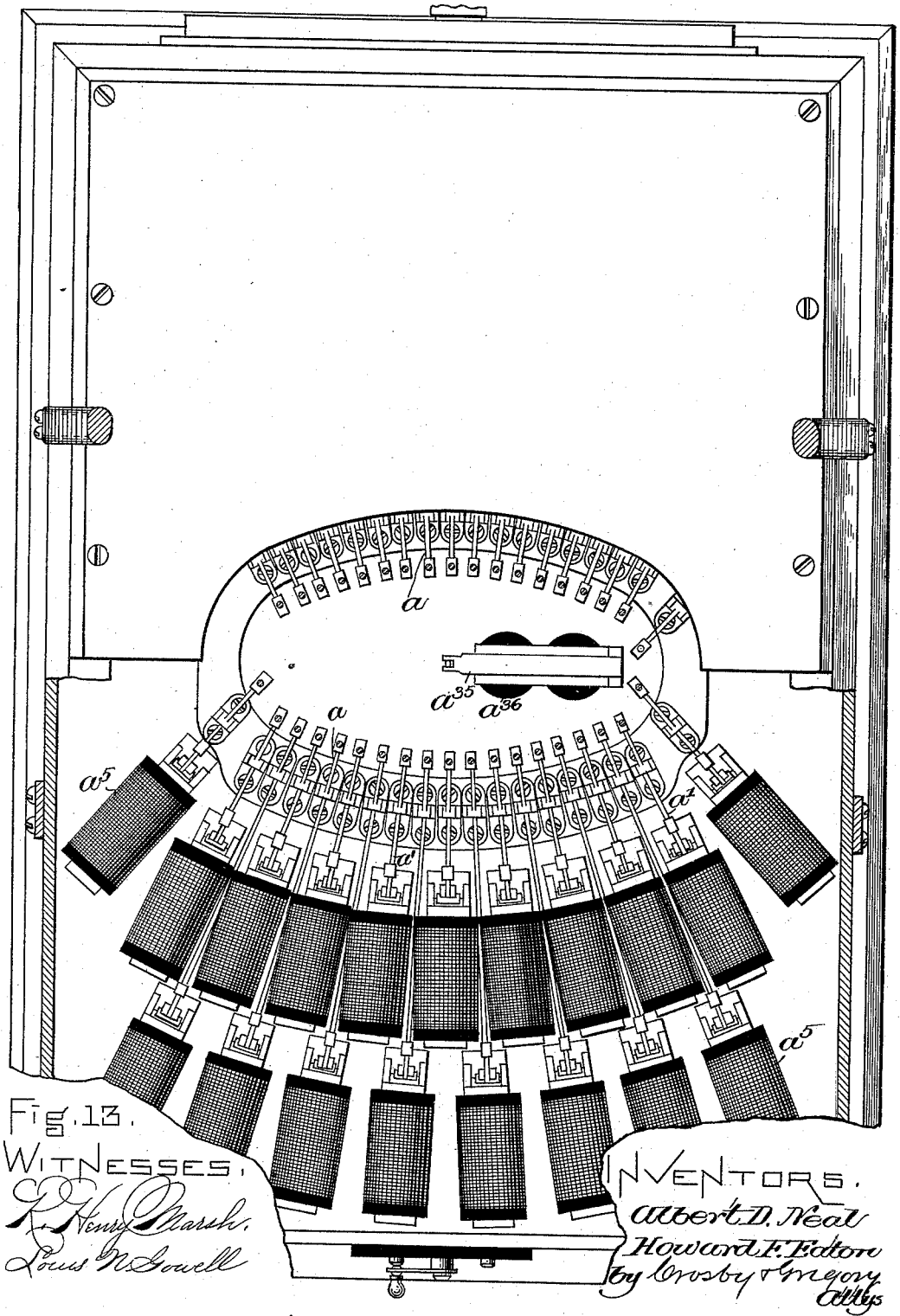

Figure 1 is a side elevation of a type-writer embodying our invention, the outside of the case or frame within which the actuating-magnets are located being removed; Figs. 2 and 3, details to be referred to; Fig. 4, a top or plan view of the machine shown in Fig. 1; Fig. 5, a rear side elevation of the machine shown in Fig. 1 on an enlarged scale; Fig. 6, a detail, on an enlarged scale, to more clearly show the construction of the circuit-closing keys; Figs. 7 and 8, details to be referred to; Fig. 8$^a$, a sectional detail of the winding-drum and spring of the motor mechanism; Fig. 9, a detail, on an enlarged scale, to more clearly show the motor mechanism; Fig. 10, a detail, on an enlarged scale, of the reversing mechanism for the carriage; Fig. 11, a top or plan view of the mechanisms shown in Fig. 10, and a portion of the reversing mechanism for the ink-ribbon; Fig. 12, a side elevation of the mechanism shown in Fig. 11, looking toward the right; Fig. 13, a top or plan view showing the arrangement of magnets; Fig. 14, a detail in plan view, on an enlarged scale, of a portion of the machine; Fig. 15, a detail in side elevation of the machine shown in Fig. 14; Fig. 16, a detail to be referred to; Fig. 17, a detail, on an enlarged scale, of the feeding mechanism for the carriage; Fig. 18, a diagram of circuits to enable the operation to be more readily understood, and Fig. 19 a diagram showing a modified arrangement of circuits.

Referring to Fig. 1, A represents the bed-plate of a type-writer, herein shown as the well-known "Remington" type-writer, the said bed-plate pivotally supporting the usual type-levers $a$, connected by links $a'$, elbow-levers $a^2$, and links or rods $a^3$ to the armature $a^4$ of electro-magnets $a^5$ located within an inclosing case $A^7$ below the type-writer, the latter being supported upon the said inclosing case in any desired manner. The electro-magnets $a^5$ are preferably arranged in substantially-semicircular rows, as clearly indicated in Fig. 13; but they may be arranged in any other convenient or desired manner.

The bed-plate A supports the movable carriage $A^2$, provided at its front end with a wheel or roller $a^6$ and at its rear end with wheels $a^7$, movable on a guide bar or rod $a^8$, the said carriage being provided with suitable bearings $a^9$ for a reel $a^{10}$, upon which is wound a roll $a^{12}$ of paper to be printed upon. The carriage $A^2$ supports a movable frame $A^3$, on which is mounted an impression-roller $a^{13}$, under which is passed the paper to be printed on, the said paper being held up against the said roller by the bands $a^{14}$, passed about a roller $a^{15}$, and wheels $a^{16}$ on a shaft $a^\times$. The carriage $A^2$ is made movable by means of a motor mechanism, which may be any usual or well-known clock-movement, consisting of a gearing actuated by a mainspring 5, having one end secured to a main shaft $a^{17}$ (see Figs. 1 and 8$^a$) and its other end being secured to the drum 6.

The carriage $A^2$ is herein shown as connected to a belt or band $a^{18}$, passed about wheels or pulleys $a^{19}$ $a^{20}$, (see Fig. 5,) the wheel or pulley $a^{19}$ being mounted on a shaft or arbor $a^{21}$, upon which is secured a pinion $a^{22}$, in mesh with a segmental rack or arm $a^{23}$ on a shaft $a^{24}$, mounted in a suitable support, herein shown in Fig. 9 as a side plate 7 of the frame or casing for the motor mechanism. The shaft $a^{24}$ is provided with a crank-arm $a^{26}$, joined by a connecting-rod $a^{27}$ to a crank $a^{28}$ on a shaft or arbor $a^{29}$, upon which is mounted a gear $a^{30}$, connected by gear $a^{31}$ and pinion $a^{32}$ to the gearing of the clock-movement. (see Fig. 5).

The mainspring 5 of the motor mechanism tends to move the belt $a^{18}$ and the carriage $A^2$ forward, or in the direction of arrow 40, Fig. 5; but the said carriage is held stationary, as herein shown, by a pallet-bar $a^{40}$, secured to or forming part of a rock-shaft $a^{41}$, (see Figs. 1, 5, and 17,) supported by arms $a^{42}$, secured to the bed-plate A. The pallet-bar $a^{40}$ is provided at its upper end with a fixed pawl $a^{33}$ and with a movable pawl $a^{34}$, pivoted to the said pallet-bar, the said movable pawl being acted upon by a spring, (not shown,) which normally forces it out of line with the fixed pawl, so that when the pallet-bar $a^{40}$ is moved, as will be described, to engage the fixed pawl with a tooth of a rack-bar $a^{35}$, secured to the movable carriage $A^2$, the movable pawl $a^{34}$ will be moved forward by its spring out of line with the fixed pawl and into position to engage the next succeeding tooth of the rack-bar, so that when the pallet-bar $a^{40}$ is restored to its normal position and the fixed pawl disengaged from the rack-bar, the said rack-bar and the carriage secured to it will be moved forward by the motor mechanism the distance of one tooth. The forward movement of the pawl $a^{34}$ is limited by the arm 9 on the pallet-bar, as shown in Fig. 17.

The forward movement or feed of the carriage $A^2$ is controlled by an electro-magnet $a^{36}$, having its armature $a^{37}$ joined to the pallet-bar $a^{40}$, as herein shown, by a direct positive connection consisting of a rod $a^{38}$, elbow-lever $a^{39}$, and link or rod $a^{50}$.

The type-levers $a$ of the machine are connected in the usual manner to the usual key-levers $b$, (see Fig. 6,) with which co-operate normally-open circuit-controllers, there being one for each key, the said circuit-controllers preferably consisting of two spring members $b'$ $b^2$, secured to the bottom $b^3$ of a box or case attached to the machine, the said spring members having arms which overlap and are separated from each other, the lower member $b'$ being preferably provided with a platinum contact-point $b^4$ to engage a platinum contact surface or plate $b^5$ on the member $b^2$. The members $b'$ $b^2$ of the circuit-controller are brought into contact with each other when a key-lever $b$ is depressed by an intermediate plunger $b^6$, preferably a rod extended through the top $b^7$ of the box or case, the said rod being herein shown as provided on its opposite ends with heads $b^8$ $b^9$ and encircled by a spring $b^{10}$, normally acting to lift the plunger up out of contact with the member $b^2$ of the circuit-controller.

The circuit-controllers $b'$ $b^2$ of one instrument, located at one station, may be connected in circuit with the electro-magnets of another instrument located at another or distant station, substantially as shown in Fig. 18, wherein only a limited number of circuit-controllers and electro-magnets, representing two instruments in two separate stations D D', are shown.

The instruments in the stations D D' are alike, and in order that their motor mechanisms may be automatically maintained wound up, or in operative condition to feed the carriage, we have provided each instrument with mechanism for accomplishing this result. The mechanism referred to consists, as herein shown, of a ratchet-wheel $b^{12}$ on a shaft or arbor $b^{13}$, (see Figs. 1 and 9,) having mounted on it a pinion $b^{14}$ in mesh with a gear $b^{15}$ on the main or winding shaft $a^{17}$ of the motor mechanism, the said ratchet-wheel being rotated by a pawl $b^{17}$, pivoted, as at $b^{18}$, to the armature $b^{19}$ of an electro-magnet $b^{20}$, which we shall hereinafter designate as the "winding-magnet," the said pawl being normally held out of engagement with the ratchet-wheel $b^{12}$ by a spring $b^{21}$, secured at one end, as herein shown, to the armature $b^{19}$ and at its other end to an upright $b^{22}$ on the electro-magnet. The winding-magnet $b^{20}$ of each instrument may be connected in series circuit with the spacing or feeding magnet $a^{36}$ of its own instrument, and also with each type-lever-operating magnet of its own instrument, as well as with the circuit-controllers of the other or co-operating instrument, as will be described.

The spacing-magnet $a^{36}$ of each instrument is connected in circuit with the circuit-controllers of its co-operating instrument, which are operated by the keys, to which are attached the type-levers, and also to a separate circuit-controller operated by a key not having a type-lever connected to it, which key we shall hereinafter designate as the "spacing-key," the circuit-controller governed by said spacing-key being marked 10 in Fig. 18, and, if desired, the winding-magnet $b^{20}$ may be connected in circuit with the spacing-magnet, so that the winding-magnet may be operated only when the spacing-key is operated, as will be hereinafter described.

Referring to Fig. 18, $D^2$ $D^3$ represent two main batteries located in the stations D D'. The battery $D^2$ in the station D, as herein shown, has its negative pole connected by wire $c$ to one member $c'$ of a switch, the co-operating member of which (herein shown as a lever $c^2$) is joined by wire $c^3$ to one member $c^6$ of a switch located in the station D', the co-operating member of the second switch (shown as a lever $c^5$) being joined to one end $c^6$ of the coil of the winding-magnet $b^{20}$ of the type-writing instrument located in the station D', the other end $c^7$ of the winding-magnet coil being connected to the spacing-magnet $a^{36}$ of the said instrument. The spacing-magnet $a^{36}$ in the station D' is joined by the wire $c^8$ and branch wire $c^9$ to the type-leveroperating magnets $a^6$, (marked 13 14 15, &c.,) and the said magnets are connected by wires 16 17 18 to the type-lever-operating magnets $a^5$, (marked 19 20 21) of the instrument in the station D.

The wires 16 17 18 (shown in Fig. 18) are connected by wires 22 23 24 to the members $b^2$ of the circuit-controllers, (marked 25 26 27,) and the co-operating members $b'$ of the said circuit-controllers are connected by the common return-wire 28 to one end of the coil of the circuit-indicating device E in the station D, the other end of the said coil being connected by wire 30 to the negative pole of the battery $D^2$.

The members $b^2$ of the circuit-controllers in the station D' (marked in Fig. 18 31 32 33) are connected by wires 34 35 36 to the wires 16 17 18, and the magnets 19 20 21 of the instrument in the station D are joined by branch wires $c^{10}$ and wire $c^{12}$ to the spacing-magnet $a^{36}$ of the instrument in the station D, the said spacing-magnet being joined by wire 37 to the winding-magnet $b^{20}$ of the instrument in the station D, the said winding-magnet being connected by wire 38 to a switch-lever $c^{13}$, co-operating with the member $c^{14}$, connected by wire 39 to the switch-lever $c^{15}$, the co-operating member $c^{16}$ of the switch being joined by wire 40 to the negative pole of the battery $D^3$, the positive pole of said battery being joined by wire 41 to the circuit-indicator E', the latter being connected by a common return-wire 42 to the members $b'$ of the circuit-controllers.

As shown in Fig. 18, the spacing-magnets $a^{36}$ in the stations D D' are joined together by a wire 43, to which the wires 44 45 are connected, the wires 44 45 being joined to the members $b^2$ of the circuit-controllers in the stations D D', respectively, and herein marked 10.

With the instruments connected as shown in Fig. 18, the spacing-magnet $a^{36}$ and the winding-magnet $b^{20}$ of the receiving-instrument, as that located in station D', are energized by the closing of any one of the circuit-controllers of the transmitting-instrument in the station D, so that the mainspring 5 of the receiving-instrument is automatically wound up, so as to practically maintain the said mainspring in its normally wound-up condition, for by referring to Figs. $8^a$ and 9 it will be seen that as the winding drum or gear 6 is revolved in the direction of arrow 50, thereby unwinding one end of the mainspring 5, the main shaft $a^{17}$ is wound in the same direction by the pinion $b^{14}$ on the shaft $b^{13}$, having the ratchet-wheel $b^{12}$, operated by the pawl $b^{17}$, attached to the armature of the electro-magnet $b^{20}$, thereby winding up the opposite end of the said mainspring substantially the same amount it is unwound by the movement of the drum 6 in the direction of arrow 50.

Each transmitting and receiving instrument is provided with the usual ink-ribbon $d$, (see Fig. 1,) passed about drums or reels $d'$, only one of which is shown in Fig. 1, mounted on shafts $d^2$ $d^3$, having bearings in suitable brackets $d^4$, attached to the bed-plate A. The shafts $d^2$ $d^3$ have mounted on them, as herein shown, (see Figs. 1 and 11,) beveled gears $d^4$ $d^5$, in mesh with beveled gears $d^6$ $d^7$ on a shaft $d^8$, having bearings in suitable brackets $d^{10}$, depending from the bed-plate A, only one of said brackets being shown in Fig. 1. The shaft $d^8$ is rotated in opposite directions to produce opposite rotations of the shafts $d^2$ $d^3$, and thereby reverse the travel of the ink-ribbon by means of a reversing mechanism governed in its operation by a controlling device, as will be described. The reversing mechanism referred to consists, as herein shown, of a bevel-gear $d^9$ on the shaft $d^8$, (see Figs. 10 to 12, inclusive,) the said gear being in mesh with a bevel-gear $d^{100}$, loose on the shaft $a^{22}$, having fast on it a disk $d^{\times}$, on which is pivoted, as at $d^{12}$, a pallet-bar $d^{13}$, provided with oppositely-inclined pawls $d^{14}$ $d^{15}$, to engage the teeth on an escapement or ratchet wheel $d^{16}$, secured to or forming part of the bevel-gear $d^{100}$, the pallet-bar $d^{13}$ having co-operating with it a spring $d^{17}$, attached to the disk $d^{\times}$. The pallet-bar $d^{13}$ is made V-shaped, as herein shown, so that the spring $d^{17}$ may engage one side to keep one pawl, as $d^{15}$, in engagement with the escapement-wheel $d^{16}$, and with the other side of the said V-shaped portion to engage the other pawl $d^{14}$ with the said escapement-wheel when actuated by the controlling device, as will be described.

The controlling device consists, as herein shown, of two uprights or posts $d^{20}$ $d^{21}$ on a bar $d^{22}$, having secured to or forming part of it on its under side a rack-bar $d^{23}$, having worm-teeth engaged by a worm $d^{24}$ on a worm-shaft $d^{25}$, on which is mounted a gear $d^{26}$, in mesh with a pinion or gear $d^{27}$ on the shaft $d^{28}$, having a gear $d^{29}$ in mesh with a pinion $d^{30}$ on the shaft $d^8$. The disk $d^{\times}$ is rotated in the direction indicated by arrow 60, Fig. 10, on each forward feed of the carriage $A^2$, and on each return movement of the said carriage the disk $d^{\times}$ is rotated back in a direction opposite to that indicated by arrow 60, and the pawl $d^{15}$ is clicked back over the ratchet or escapement wheel $d^{16}$ until the disk $d^{\times}$ is again moved in the direction of arrow 60, the ratchet-wheel $d^{16}$ being held substantially stationary, as herein shown, by the friction between the gearing connecting the bevel-pinion $d^{100}$ with the work-shaft $d^{25}$. As the bevel-pinion $d^{100}$ is thus rotated in the direction of arrow 60 on each forward feed of the carriage $A^2$ the worm-shaft $d^{25}$ is rotated in the direction indicated by the arrow thereon in Fig. 10, and the rack-bar $d^{23}$ is moved in the direction indicated by arrow 70 until the post $d^{20}$ has been brought into position to be struck by the pallet-bar $d^{13}$, and when so struck the pallet-bar is turned on its pivot $d^{12}$ and the pawl $d^{14}$ engaged with the ratchet-wheel $d^{16}$, the spring $d^{17}$ at such time resting upon the opposite side of the pallet-bar, so that when the disk $d^{\times}$ is again moved in the direction of arrow 60 on the forward feed of the carriage $A^2$, the pawl $d^{14}$ will click over the ratchet-wheel and on the movement of the disk $d^x$ in the direction opposite to that indicated by arrow 60—that is, on the backward movement of the carriage $A^2$ the ratchet-wheel $d^{16}$ and the bevel-pinion $d^{100}$ will be rotated in the reverse direction—that is, in the direction opposite to that indicated by arrow 60—thus producing a reverse rotation to the worm-shaft and moving the rack-bar $d^{23}$ in the direction opposite to that indicated by arrow 70. The gearing connecting the bevel-pinion $d^{100}$ with the worm-shaft is arranged so that it requires a number of rotations of the bevel-pinion $d^{100}$ to produce one revolution of the worm-shaft $d^{25}$. As the pinion $d^{100}$ is revolved in the direction of arrow 60 the ink-ribbon is moved in one direction, as indicated by arrow 80, Fig. 11, and when the said pinion is revolved in the direction opposite to that indicated by arrow 60 the ink-ribbon is unwound or made to travel in a direction opposite to that indicated by arrow 80. The ink-ribbon continues to be fed in the direction opposite to that indicated by arrow 80 until the stud or post $d^{21}$ is brought into position to be struck by the pallet-bar $d^{13}$, thereby disengaging the pawl $d^{14}$ from the ratchet-wheel $d^{16}$ and engaging the pawl $d^{15}$, as shown in Fig. 10. The gearing connecting the bevel-pinion $d^{100}$ with the worm-shaft $d^{25}$ is preferably so timed that substantially the whole of the ink-ribbon will be fed out in one direction before the rotation of the worm-shaft is reversed to feed the ribbon in the opposite direction.

The roll $a^{12}$ of paper is automatically fed forward at the end of the travel of the carriage $A^2$ across the machine in one direction, as indicated by arrow 100, Fig. 4, substantially as in the application above referred to, the shaft of the impression-roller $a^{13}$ having mounted on it a collar $e$, provided with a depending arm $e'$, (see Figs. 1 and 15,) to which is pivoted a pawl $e^2$, in engagement with a ratchet-wheel $e^3$ on the shaft of the impression-roller. The arm $e'$ has pivoted to it a preferably beveled or rounded foot $e^4$, which engages a cam $e^5$, fixed on the frame of the machine, the said cam having an inclined face, upon which the foot rides as the carriage $A^2$ approaches the end of its reciprocation in the direction of arrow 100. As the foot $e^4$ rides up the inclined cam $e^5$ the pawl-carrying arm $e'$ is moved so as to rotate the ratchet-wheel the distance of one tooth in the direction of arrow 110 in Fig. 15. The pivoted foot $e^4$ is beveled or rounded at its lower end, as herein shown, so that if the carriage $A^2$ is lifted up when near the end of a line and while the foot $e^4$ is over the cam $e^5$ the said carriage may be dropped down into its operative position, the foot $e^4$ being turned on its pivot into its dotted-line position (shown in Fig. 16) by the cam $e^5$, the said pivoted foot remaining in its dotted-line position until withdrawn from contact with the cam $e^5$ by the movement of the carriage $A^2$ in the reverse direction.

The frame $A^3$, carrying the impression-roller, is made movable backward and forward on the carriage $A^2$, substantially as in our application referred to, the said frame being provided on its under side with lugs $f$, engaged by a rod $f'$, having secured to or forming part of it an arm $f^2$, to which is pivoted a bar $f^3$, having secured to it the armature of electro-magnets $f^4 f^5$, located above the case and connected to suitable circuit-controllers of the transmitting-instrument, operated by keys suitably marked to indicate capital and small letters, so that when one key is struck the armature will be attracted by the magnet $f^4$ and moved in one direction to slide the movable frame $A^3$ back on the carriage $A^2$, so as to place the impression-roller over one letter—as, for instance, the capital letter—and when the other magnet $f^5$ is energized the armature will be attracted in the opposite direction to move the frame $A^3$ back into its normal position to place the impression-roller in position to receive the blow from the small letters, which positions are clearly indicated by full and dotted lines, Fig. 3.

The transmitting and receiving instruments have each secured to them a circuit-indicating device (shown in Figs. 7 and 8 as a case $f^{10}$) provided with an opening in its top with which normally registers a sign $f^{12}$, secured to an armature $f^{13}$, pivoted in side supports $f^{14}$ and surrounded by a coil $f^{15}$, so that when the circuit of any one magnet of one instrument is closed and the circuit is in operative condition the armature will be deflected so as to move the said sign, and thus indicate to the operator that the receiving-instrument is in correct working condition.

With the instruments connected in circuit, as shown in Fig. 18, a message may be sent from one station to the other, as desired. For instance, let it be supposed that a message is to be sent from the station D to station D'. The operator at station D closes his switch $c^2$ at the transmitting-instrument in station D and then strikes the keys of the transmitting type-writer. If the circuit is complete, the indicating device will be operated and if the said device is not operated when a key is depressed the operator will know that the circuit is open in the receiving-station, and he may then call up the receiving-instrument by means of a magneto-bell in usual manner, the said bell being not herein shown, but in practice being in an independent circuit. The operator then depresses the keys representing the different letters of the message to close the circuits of the different magnets $a^5$ of the receiving-instrument, operating the type-levers corresponding to the said letters.

The circuits from the different controllers of the transmitting-instrument being alike, we shall trace but one—as, for instance, the circuit of the controller marked 26—viz., from the positive pole of the battery $D^2$ by wire 30, indicator E, and wire 28 to member $b'$ of the controller 26, thence by member $b^2$ and wire 23 to wire 17, thence to magnet $a^5$, (marked 14,) wires $c^9$ $c^8$, spacing-magnet $a^{36}$ of receiving-instrument, wire $c^7$, winding-magnet $b^{20}$ of receiving-instrument, wire $c^6$, switch-lever $c^5$, wire $c^3$, switch-lever $c^2$, and wire $c$ to negative pole of battery $D^2$. As the magnet $a^5$ (marked 14) of the receiving-instrument is energized it attracts its armature and operates the type-lever connected to said armature, thus printing upon the paper of the receiving-instrument a letter or character corresponding to the letter or character indicated by the key of the transmitting-instrument which was depressed to close the circuit-controller 26.

If it is desired to send a message from the station $D'$ to station D, the transmitting-instrument in the station $D'$ will be operated and the message will be printed on the receiving-instrument in the station D.

As shown in Fig. 18, the winding-magnet is energized when each type-lever-operating magnet of the receiving-instrument is energized; but we do not desire to limit our invention in this respect, as the said winding-magnet may be connected in circuit, as shown in Fig. 19, so that the winding-magnet will be energized only when the independent circuit-controller 10, governing the spacing-magnet, is operated. In this instance the winding-magnets are located in the line-circuit 43, and by referring to Fig. 19 it will be seen that when the spacing-key is operated to close the circuit-controller 10 in the station D the circuit is completed through the winding and spacing magnets of the instrument in the station $D'$, which circuit may be traced as follows: from the positive pole of battery $D^2$, wire 30, indicating-instrument E, and wire 28 to member $b'$ of circuit-controller 10, thence by member $b^2$, wires 44 43, winding-magnet $b^{20}$, and spacing-magnet $a^{36}$ of instrument in station $D'$, thence by wire 85, switch-lever $c^5$, wire $c^3$, switch-lever $c^2$, and wire $c$ to negative pole of the battery $D^2$.

The circuit of a type-lever-operating magnet $a^5$ may be traced as follows, viz: from positive pole of battery $D^2$ by wire 30, indicator E, and wire 28 to member $b'$ of circuit-controller 25, thence by member $b^2$, and wire 22 to wire 16, where two complete circuits are afforded for the current, one by wire 16, magnet $a^5$ of the receiving-instrument, (marked 13,) wire $c^8$, spacing-magnet $a^{36}$, wire 85, switch-lever $c^5$, wire $c^3$, switch-lever $c^2$, and wire $c$ to negative pole of the battery $D^2$, the other circuit from the wire 16 being through the magnet $a^5$ of the transmitting-instrument,(marked 19,) wire $c^{12}$, wire 86, winding-magnet $b^{20}$ of transmitting-instrument, wire 43, winding-magnet $b^{20}$ of receiving-instrument, spacing-magnet $a^{36}$ of receiving-instrument, wire 85, switch-lever $c^5$, wire $c^3$, switch-lever $c^2$, and wire $c$ to negative pole of the battery. The latter circuit is of such high resistance as compared with the first circuit that substantially little, if any, of the circuit flows through it, but takes the path of less resistance, and the amount of current passing through the magnet marked 19 is so small as not to have any effect upon it, and consequently the type-lever controlled by the said magnet will not be operated, and only the type-lever of the receiving-instrument which is operated by the magnet 13.

We claim—

1. In a type-writer, the combination, with a movable carriage and a carrier to which said carriage is attached, of a motor mechanism consisting of a main shaft provided with a gear, a segmental gear in mesh with a pinion on a shaft on which the carriage is mounted, and intermediate gearing, substantially as described, to connect the said segmental gear with the gear on the main shaft, and an electro-magnet to rotate the main shaft in a direction opposite to the movement of the said drum, substantially as described.

2. In a type-writer, the combination of the following instrumentalities, viz: a movable carriage, a carrier to which said carriage is attached, a shaft $a^{22}$, to which the carrier is attached, a motor mechanism to rotate said shaft, an ink-ribbon, shafts upon which the said ribbon is wound, a gear $b^{100}$, loose on the shaft $a^{22}$, intermediate gearing to connect the gear $b^{100}$ with gears on the ribbon-shafts, an escapement-wheel $d^{16}$, fast to the loose gear $b^{100}$, a disk $d^x$, fast on the shaft $a^{22}$, a pallet bar pivoted to the disk $d^x$ and provided with oppositely-inclined pawls to engage with said escapement-wheel, a spring to hold one of the said pawls in engagement with the escapement-wheel at a time, a controlling device co-operating with the pallet-bar and consisting of uprights $d^{20}$ $d^{21}$, a rack-bar to which said arms are secured, a worm engaging with said rack-bar, and gearing to connect the said worm with the gearing operating the feed of the ink-ribbon, substantially as described.

3. In a type-writer, the combination, with a movable carriage and a carrier to which said carriage is connected, consisting of a band and pulleys $a^{19}$ $a^{20}$, the pulley $a^{19}$ being mounted on a shaft $a^{22}$, of a motor mechanism consisting of a main shaft provided with a gear, a segmental gear in mesh with a pinion on the shaft $a^{22}$, a connecting-rod joining said segmental gear to a crank $a^{28}$ on an intermediate shaft $a^{29}$, a gear $a^{30}$ on said intermediate shaft, and gearing connecting the gear $a^{30}$ with the gear on the main shaft, substantially as described.

4. In a type-writer, the combination, with a movable carriage and a carrier to which said carriage is connected, consisting of a band and pulleys $a^{19}$ $a^{20}$, the pulley $a^{20}$ being mounted on a shaft $a^{22}$, of a motor mechanism to move said carrier, a frame $d^x$ on the shaft $a^{22}$, a pinion $d^{10}$, and escapement-wheel $d^{16}$, loose on said shaft, a pallet-bar pivoted to said frame and having oppositely-inclined pawls, and a spring to act on said pallet-bar and keep one of the said pawls in engagement with the escapement-wheel, a bevel-gear $d^9$ in mesh with the pinion $d^{10}$, a shaft $d^8$, on which the said gear is mounted, pinions on said shaft in mesh with pinions on the ink-ribbon shafts $d^2$ $d^3$, and a controlling device consisting of a worm-shaft driven from the shaft $d^8$, and a rack or worm bar having posts or studs to engage the pallet-bar, substantially as described.

5. In a type-writer system of communication, the combination, with a type-writer located at one station and a plurality of circuit-controllers co-operating with the keys of the said type-writer, of a receiving type-writer having its character-levers operated by movement of the armatures of electro-magnets in circuit with said circuit-controllers, a carriage, an impression-roller carried by said carriage, a ratchet-wheel to rotate said roller, an arm provided with a pawl to actuate said ratchet-wheel and having a pivoted toe or foot, and a cam to act on the said arm to produce rotation of the said ratchet-wheel, substantially as described.

6. In a type-writer system of communication, the combination, with a transmitting type-writer and a plurality of circuit-controllers co-operating with the keys of the said type-writer, of a receiving type-writer having its character-levers operated by movement of the armatures of electro-magnets in circuit with said circuit-controllers, a carriage provided with an impression roller or surface, a carrier to which said carriage is attached, a motor mechanism to move said carriage, consisting of a winding-drum, a shaft $a^{17}$, on which said drum is loosely mounted, means to connect the drum to the shaft, intermediate gearing connecting said drum with the carriage-carrier, and a winding-magnet to rotate the shaft $a^{17}$ in a direction opposite to the rotation of the drum, whereby the motor mechanism may be maintained in operative condition, substantially as described.

7. In an electro-mechanical type-writer, the combination of the following instrumentalities, viz: a movable carriage, a carrier to which said carriage is attached, a motor mechanism consisting of a main shaft provided with a drum loose on said shaft, and means to connect the said drum to the shaft, intermediate gearing connecting the said drum with the said carrier, and an electro-magnet to rotate the shaft in a direction opposite to the movement of the drum, substantially as described.

In testimony whereof we have signed our names to this specification in the presence of two subscribing witnesses.

ALBERT D. NEAL.
HOWARD F. EATON.

Witnesses:
GEO. W. GREGORY,
FRANCES MAY NOBLE.